United States Patent [19]

Katoh

[11] 3,851,816

[45] Dec. 3, 1974

[54] AUTOMATIC TAPE LOADING TYPE RECORDING AND/OR REPRODUCING APPARATUS HAVING A PINCH ROLLER ACTUATING DEVICE

[75] Inventor: Hiroshi Katoh, Yokohama-City, Japan

[73] Assignee: Victor Company of Japan, Ltd., Yokohama, Kanagawa-ken, Japan

[22] Filed: July 18, 1973

[21] Appl. No.: 380,342

[30] Foreign Application Priority Data

July 21, 1972 Japan .............................. 47-72549

[52] U.S. Cl. ...................... 226/91, 226/177, 360/95

[51] Int. Cl. .......................................... G11b 17/02

[58] Field of Search ............ 226/91, 176, 177, 180; 179/100.2 ZA; 360/85, 95

[56] References Cited

UNITED STATES PATENTS 3,721,776 3/1973 Inaga .......................... 179/100.2 T 3,756,714 9/1973 Caraway .......................... 226/90 X

*Primary Examiner*—Richard A. Schacher

[57] ABSTRACT

An automatic tape loading type recording and/or reproducing apparatus has an improved pinch roller actuating device. A tape-form recording medium is loaded into a specific tape path outside of a tape housing structure and thereafter signals are recorded/reproduced on/from the tape-form recording medium. A pinch roller is moved into an operative position and pressed against a capstan with the tape-form recording medium interposed therebetween. The pressing means is moved into the vicinity of the operative position interrelatedly with the loading operation of the tape loading means. A driving means is started in a small-load state and, at the time of final-period action, at which time energy has been accumulated, the pressing means moves toward the operative position thereby pressing and locking the tape in an operative position.

4 Claims, 10 Drawing Figures

PATENTED DEC 3 1974

3,851,816

AUTOMATIC TAPE LOADING TYPE RECORDING AND/OR REPRODUCING APPARATUS HAVING A PINCH ROLLER ACTUATING DEVICE

BACKGROUND OF THE INVENTION

The present invention relates generally to a recording and/or reproducing apparatus of the automatic tape loading type, having a pinch roller actuating device.

More particularly, the invention relates to an automatic tape loading type recording/reproducing apparatus having a pinch roller actuating device. The apparatus draws out a tape form recording medium from a tape storing housing structure such as cassette. The tape is moved into a loaded state in a prescribed tape path to carry out recording/reproducing in the apparatus. The movement carrying out the tape loading operation is utilized to cause the pinch roller to approach, beforehand, the capstan side to a specific distance therefrom. Then, upon the completion of the tape loading operation by the tape loading means, a solenoid is activated. The pinch roller is caused by the final movement of the solenoid to move again to the capstan side, thereby to press against the capstan.

In general, in a recording/reproducing apparatus such as a tape recorder or a VTR in which a tape is used as a recording medium, the tape is clamped between and driven by a capstan and a pinch roller. In an apparatus of this character, an electromagnetic solenoid or some other known actuating device is used as a driving power source for causing the pinch roller to move from its released position to its operative position at which it presses against the capstan with the tape interposed therebetween. Moreover, the solenoid is adapted to move the pinch roller from beginning of the attracting action through the total stroke of the operation of the solenoid. For this reason, in this pinch roller actuating device, the force for moving the pinch roller and the force for pressing it against the capstan is determined by the characteristics of the solenoid.

Furthermore, in a tape recorder of general type for recording/reproducing sound signals, a magnetic tape of ¼ inch width is used. The tape path is extremely simple. For this reason, a small pressing force of the pinch roller against the capstan suffices for clamping and driving the magnetic tape. A pinch roller actuating device of the above description has a fully satisfactory performance capacity.

In a recording/reproducing apparatus of automatic tape loading type, however, the magnetic tape used therein is wider than that used in an ordinary tape recorder. Moreover, the tape path formed and followed by the tape upon being drawn out of the tape storing housing structure is complicated. For this reason, it is necessary to press the pinch roller with an extremely large force against the capstan in order to achieve satisfactory clamping and driving of the tape. Accordingly, in cases where a pinch roller actuating device of the above description is applied to an automatic tape loading recording/reproducing apparatus, a solenoid device must have a large capacity. Therefore, it must be heavy and costly in order to press the pinch roller with sufficient clamping force against the capstan. As a result, the entire apparatus becomes bulky and has a high power consumption.

In general, a pinch roller actuating device of known type comprises a pressing lever for engaging the pinch roller and causing it to move to the capstan side, an actuating lever coupled to the plunger rod of a solenoid and operated directly by the actuation of the solenoid, and a spring member installed between the pressing lever and the actuating lever. The pressing lever is positioned by a connecting member on the capstan side, relative to the actuating lever. In this known device, the position adjusting control of the pressing lever can be carried out relatively easily by adjusting the connecting member. However for adjustment of the pressing force of the pinch roller against the capstan, it becomes necessary to shift the mounting position of the solenoid. The adjustment becomes extremely difficult. Furthermore, because of the adjustment of the mounting position of the solenoid, it becomes impossible in some cases to utilize effectively the attracting characteristics of the solenoid for pressing the pinch roller.

SUMMARY OF THE INVENTION

Accordingly, it is a general object of the present invention to provide a new and useful recording/reproducing apparatus of automatic tape loading type, having a pinch roller actuating device in which the above described difficulties heretofore encountered are overcome.

More specifically, an object of the invention is to provide a recording/reproducing apparatus of the above stated character with means for pressing the pinch roller with a large force against the capstan responsive to a movement to the operative position. The pressing means is forced to move to the operative position by utilizing stored energy at the time of completion of the movement of the driving means, and is locked at the operative position by locking means. In accordance with the invention, it is possible to hold the pinch roller in the state wherein it is pressed against the capstan with the driving power of the driving means in a state which is reduced from that at the time of movement of the pinch roller into pressing state. This feature is effective in lowering the power consumption.

Another object of the invention is to provide a recording/reproducing apparatus of the above stated character in which the locking means for locking the pressing means in the state wherein the pinch roller is pressed against the capstan is placed in the operative and released states, in accordance with the movement of the pressing means into the operative and inoperative positions. A feature of the apparatus of the invention is that there is no necessity of providing special and separate means for moving the locking means into operative and released positions, interrelatedly to the movement of the pressing means. The lock releasing movement of the locking means and the pressing means is accomplished by placing the driving means in a released state.

Still another object of the invention is to provide a recording/reproducing apparatus of the character defined above in which the pinch roller pressing means is moved beforehand approximately to the operative position responsive to the revolution a revolving ring to its terminal position. This revolving ring is provided to draw the tape out from the tape storing housing structure and cause it to be loaded in a specific tape path.

A further object of the invention is to provide a recording/reproducing apparatus of the character defined above in which the pinch roller pressing means, which has been moved to the vicinity of the operative position, is further moved to the operative position responsive to the final-stage in the attracting action of a solenoid.

An additional object of the invention is to provide a recording/reproducing apparatus of the above defined character, with means for individually adjusting the pressing force of the pinch roller against the capstan and means for adjusting the position of the pinch roller to independently carry out their respective adjusting functions. A feature of this invention is that it is not necessary to readjust the installation position of the driving means for moving the pressing means toward the operative position at the time of making of these adjusting means.

Other objects and further features of the present invention will be apparent from the following detailed description set forth in conjunction with the accompanying drawings.

DETAILED DESCRIPTION

The structural organization and operation of the automatic tape loading, recording/reproducing apparatus having an improved pinch roller actuating device according to the present invention will first be described with reference to FIGS. 1, 2, 3, 4A and 4B.

Figure 1:
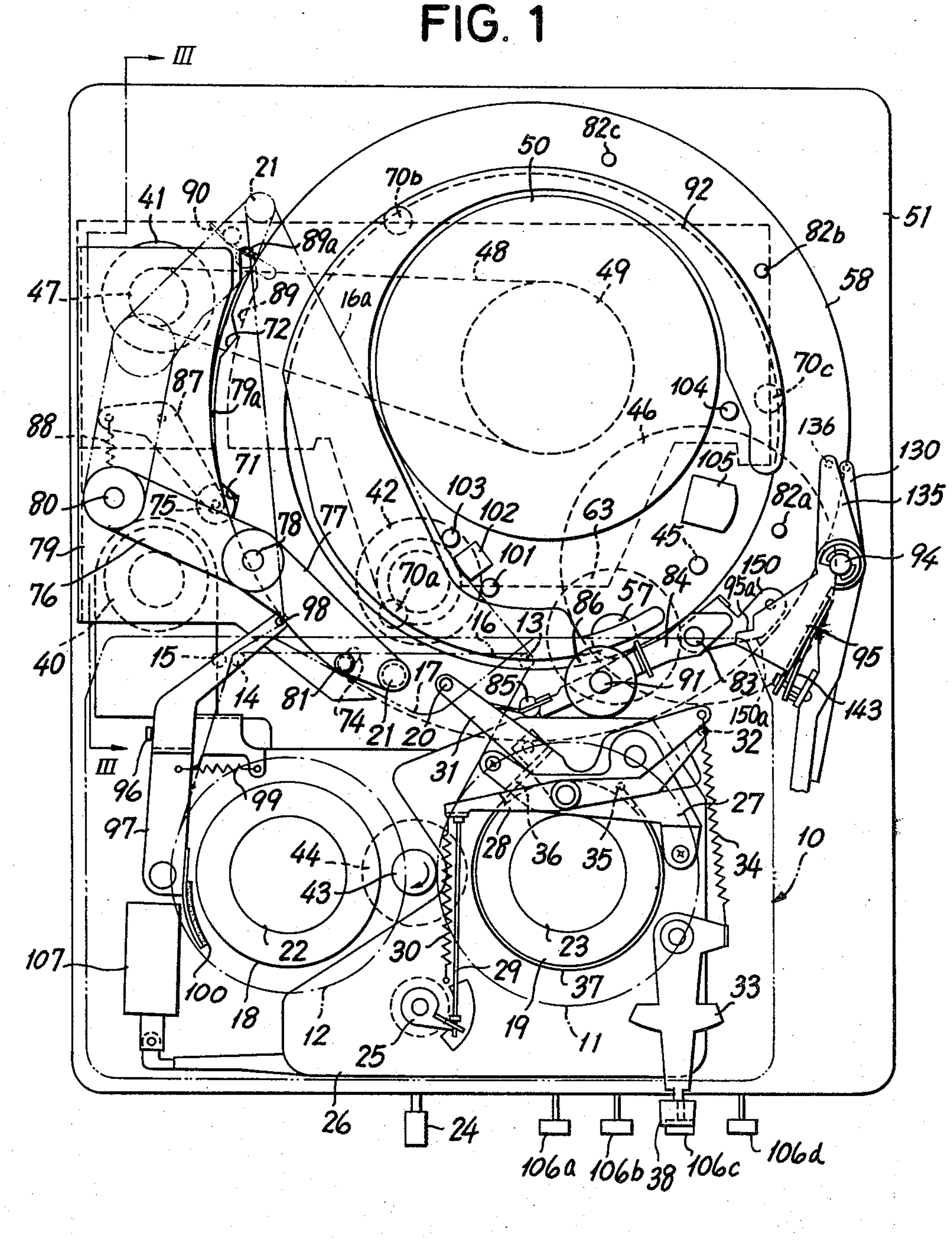
FIGS. 1 and 2 are plan views showing one embodiment of an automatic tape loading type recording/reproducing apparatus, according to the present invention, respectively, in the inoperative and operative states.
Figure 2:
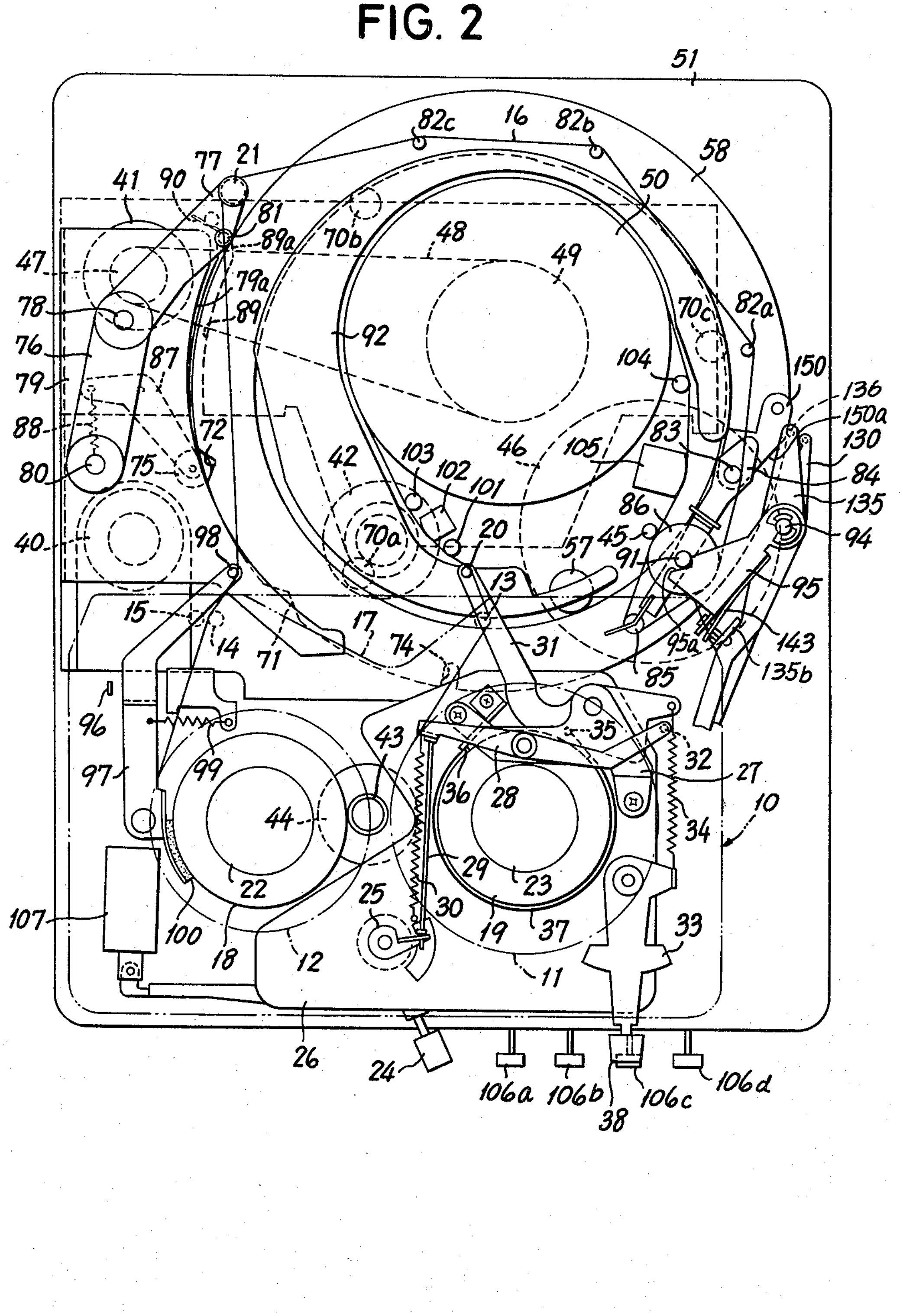
Figure 3:
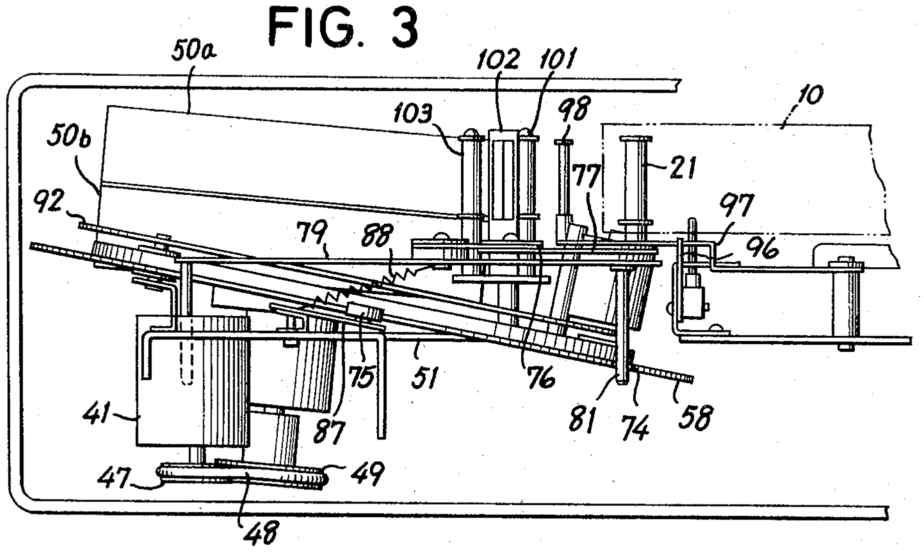
FIG. 3 is a side view in vertical section taken along the line III — III in FIG. 1 and viewed in the arrow direction.

Referring principally to FIGS. 1, 2 and 3, a tape cassette 10 contains therein a tape supply roll 11 and a tape take-up roll 12. Within the tape cassette 10, there are further provided tape guide pins 13, 14 and 15. A magnetic tape 16 is drawn out from the tape supply roll 11 guided by the guide pin 13. The tape passes by the front surface of the cassette, and, passing between the pins 14 and 15, reaching the tape take-up roll 12.

The cassette 10 is provided at its forward or innermost surface and bottom surface with a cut out opening 17, with a shutter cover (not shown) opened by the insertion of the cassette into loaded position within the apparatus. The shutter protects the magnetic tape 16 within the cassette when it is not being used. When the cassette 10 is mounted on the tape supply reel disc 19 and the tape take-up reel disc 18 as shown in FIG. 1, this shutter cover is held open. A tension pole 20 and a guide pole 21 are inserted within the cassette opening 17. The tape supply and take-up reel discs 19 and 18 are of known arrangement. Their upper reel discs 22 and 23 are respectively mounted on the upper surface thereof with friction material interposed therebetween. In their states indicated in FIG. 1, these reel discs 18 and 19 are free to rotate.

First, the loading operation carried out during a play control operation or video-audio recording control operation will be described. For the play operation, a play control lever 24 is turned to the right (counterclockwise as viewed from above) to the lock position indicated in FIG. 2. For video-audio recording operation, a video-audio recording control button 106*c* is pushed in. At the same time, the control lever 24 is turned in the same manner as for play operation.

This manipulation of the control lever 24 causes a connector 25 to rotate similarly in the counterclockwise direction. A lock lever 28 is rotatably held on a holder 27 fixedly mounted on a sub-chassis 26 and rotated in the clockwise direction against the force of a spring 30, by a connecting rod 29 linking one end of the lock lever 28 to the connector 25. Consequently, a supply-side tension lever 31 is rotatably held on the lower side of the holder 27 and released from engagement by an engagement pin 32 embeddedly fixed to the lower side of the other end of the lock lever 28 and is thereby turned clockwise by the tension force of a spring 34 stretched between the tension lever 31 and a skew control lever 33.

As one result of this rotation of the tension lever 31, the aforementioned tension pole 20 embeddedly secured to the other end of the tension lever 31 is extracted from the interior of the cassette 10 through the opening 17. As it thus moves out, it intercepts the magnetic tape 16 and draws it out of the cassette. Furthermore, as another result of the rotating of the tension lever 31, a brake band 37 encircling the reel disc 19 is tightened. This band 37 is connected at its two ends respectively to a pin 35 embeddedly fixed to the lever 31 and to an anchor member 36 on the subchassis 26. A braking force is applied to the supply-side reel disc 19 for imparting a back tension to the magnetic tape 16 paid out from the tape roll 11. The above mentioned skew control lever 33 is actuated by means of a knob 38 and is locked in a specific position.

As another result of the above mentioned manipulation of play control lever 24, an electrical circuit including a capstan motor 40 and a head motor 41 is closed. These motors 40 and 41 are started. The rotation of the motor 40 is transmitted through a belt (not shown) to rotate an intermediate pulley 42 intergral with a two-stage pulley rotation is in the clockwise direction. Further through a belt (not shown), a drive roller 43 and an integrally formed rewind roller 44 and flywheel 46 connected to a capstan 45 are turned in the clockwise direction. At this time, the drive roller 43 is pressing against the take-up side reel disc 18, and a counterclockwise rotating torque is imparted to the reel disc 18.

The rotation of the head motor 41 is transmitted through a pulley 47, a belt 48, and a pulley 49 to cause an upper guide drum 50*a* of the guide drum 50 to rotate clockwise at high speed. As shown in FIG. 3, the guide drum 50 comprises a lower guide drum 50*b* fixed to the chassis 51 of the apparatus and the upper guide drum 50*a* having a rotating video head (not shown) and rotatably supported at a position slightly separated from the lower guide drum 50*b* and is inclined so that its part confronting an erasing head 102 is at a low position.

As still another result of the aforementioned turning of the play control lever 24, an operation lever 52 is turned clockwise. The mechanism for driving the revolving ring is placed in the state indicated in FIG. 4A. A holding lever 53 is urged by the tension force of a spring 54 to rotate in the counterclockwise direction relative to a shaft 55. For loading, a drive roller 57 journaled on a stud pin 56 embeddedly fixed to the holding lever 53 is pressed against the inner rim of the revolving ring 58.

As a result of the above mentioned rotation of the operation lever 52, an unloading lever 59 is placed in its released state as described hereinafter, while a loading lever 60 is placed in its operative state. Furthermore, a gear 61 is caused to mesh with both a gear 62 formed integrally with the capstan 45 and a gear 63 formed integrally with the drive roller 57 for loading. Consequently, the clockwise rotation of the capstan 45 is transmitted by way of the gears 62, 61, and 63 to rotate the drive roller 57 clockwise. The revolving ring 58 begins to revolve clockwise from the position indicated in FIG. 1.

The revolving ring 58 is held with a specific angle of inclination, relative to the chassis 51, by guide rollers 70*a*, 70*b*, and 70*c*. This revolving ring 58 is provided at specific points on its outer rim with V-shaped notches 71 and 72 and a U-shaped cutout 74 and is limited in revolution at a position where a roller 75 fits into the notch 71. A first arm 76 and a second arm 77 are rotatably connected by a shaft 78. The proximal part of the first arm 76 is rotatably supported on a pin 80 embeddedly fixed to a bracket 79 crossing the ring 58 in the side view of FIG. 3. The second arm 77 supports the aforementioned guide pole 21 embeddedly fixed to upper part of its distant end and a pin 81 embeddedly fixed to the lower side thereof. The pin 81 extends to a position for fitting into the U-shaped cutout 74 and is prevented from disengaging from the cutout 74 by an arcuate guide surface 79a of the bracket 79.

The revolving ring 58 is provided on its upper surface with guide pins 82*a*, 82*b* and 82*c* and a pivot pin 83 embeddedly fixed thereto. A pinch roller supporting lever 84 is pivoted on the pin 83 and is urged to turn in the counterclockwise direction by a torsion spring, but is limited from thus turning at the position indicated in FIG. 1. This lever 84 is provided at its distant end with a tape guide pole 85 and at approximately its middle part with a pinch roller 86.

As the revolving ring 58 begins to revolve, an approximately L-shaped lever 87 holding the aforementioned roller 75 at the end of one of its arms is rotated clockwise against the force of a spring 88, whereupon the roller 75 is disengaged from the V-shaped notch 71 and pressed against the outer peripheral surface of the ring 58. The pin 81 fitted in the U-shaped cutout 74 moves together with the revolving of the ring 58 as it is guided by the arcuate guide surface 79*a* as indicated in FIG. 1. Consequently, the first arm 76 is rotated in the counterclockwise direction relative to the pin 80, while the second arm 77 is rotated in the clockwise direction relative to the shaft 78. As the ring 58 revolves further, the lower end portion of the pin 81 being guided by the guide surface 79*a* enters the arcuate slot 89 formed in the chassis 51 along the outer periphery of the revolving ring 58 through the opening of the slot, and the pin 81 is this time guided by the side walls of the slot 89 to move together with the revolution of the ring 58, separating from the above mentioned arcuate guide surface 79*a*.

As the revolving ring 58 revolves until the cutout 74 reaches the position indicated by a two-dot chain line in FIG. 1, the pin 81 is guided by the bent slot part 89*a* of the arcuate slot 89 and is moved outward in the radial direction of the ring 58. The pin 81 thereby disengages and moves out of the open end of the cutout 74 and fits into the inner part of the bent slot part 89*a* against the spring force of a torsion spring 90 as indicated in FIG. 1. When the ring 58 further revolves slightly from the above mentioned position, the pin 81 is completely extracted out of the cutout 74 and is pressed against the outer peripheral edge of the ring 58 by the torsion spring 90 and is locked within the bent slot part 89*a*. During the second half of the revolution of the revolving ring 58 up to the above mentioned position, the first arm 76 is rotated clockwise, while the second arm 77 is rotated counterclockwise and placed in the state indicated by a two-dot chain line in FIG. 1.

The first and second arms 76 and 77 are rotated counterclockwise, with respect to the shaft 80, interrelatedly with above descrived revolution of the revolving ring 58 as they (arms 76, 77) change their folded state. The guide pole 21 is fixed to the upper part of the distant end of the second arm 77. As it is extracted out through the opening 17 of the cassette 10, it intercepts and engages the magnetic tape 16 uniformly over its entire width. Then, as the revolving ring 58 revolves clockwise, it draws the tape out of the cassette 10 in the horizontal direction. When the pin 81 is locked within the bent slot part 89*a*, a tape loop 16*a* of approximately triangular shape is formed in the plane of the cassette 10, as indicated by two-dot chain line in FIG. 1.

Thereafter, the revolving ring 58 continues revolving by itself. This ring 58 is orientated with an inclination such that its lowermost position confronts the lower side position of the cassette as shown in FIG. 3. The tape guide pole 85, the pinch roller 86, the guide pins 82*a*, 82*b* and 82*c*, and like parts enter the above mentioned triangular tape loop 16*a* from below and rise as the ring 58 revolves. Consequently, the leading tape guide pole 85, comes out of the tape loop 16*a* and intercepts the magnetic tape 16. It pulls this tape as the ring 58 revolves, causing it to be wrapped around the cylindrical peripheral surface of the guide drum 50. At this time, since the upper guide drum 50*a* is being driven at high rotational speed by the motor 41, a thin air film is formed between this upper guide drum 50*a* and the magnetic tape 16 wrapped therearound. Thus, the above mentioned pulling of the tape 16 can be accomplished with relative ease.

When guide pale 85 on the revolving ring 58 engages the magnetic tape 16 and pulls the tape around along the peripheral surface of the guide drum 50 as described above, it reaches a point slightly short of the final revolutional position indicated in FIG. 2. A projection (not shown) on the lower surface of the ring 58 strikes against the aforementioned bent loading lever 60 disposed in its operative position, whereupon this loading lever is rotated clockwise. Consequently, the revolving ring drive mechanism is placed in the state indicated in FIG. 4B. The gear 61 disengages the gear 62, removing driving power from the capstan 45 to the drive roller 57. Thereafter, the capstan 45 rotates singly by itself without any special load whatsoever.

Furthermore, the revolution of the revolving ring 58 to the above mentioned position, a second lever 135 of the pinch roller actuating device (FIGS. 5A and 5B) is rotated clockwise through a predetermined angle against the force of a spring (not shown). An engagement pin 136 fixed in the lower surface of one end of the lever 135 is guided by an inclined guide surface 150*a* of a guide plate 150 provided on the revolving ring 58. Similarly, a pinch roller pressing lever 95 rotates relative to a pin 94 to the vicinity of an operative position, as indicated by single-dot chain line in FIG. 5A.

Accordingly, the shaft 91 of the pinch roller 86 engages a notch 95*a* in the pressing lever 95 of bent channel shape. The pinch roller 86 rotates together with the supporting lever 84 and presses the magnetic tape 16 with light pressure against the capstan 45. At this time, the pinch roller 86 is pressing against the capstan 45 with an extremely weak force, whereby the clamping and driving of the tape 16 by the pinch roller 86 and the capstan 45 is not performed.

The revolving ring 58, is no longer supplied with driving power, and is limited at the angular position (FIG. 2) at which the roller 75 has engaged the V-shaped notch 72. As a result of the revolution of the ring 58 to its final position, a microswitch (not shown) is closed. The apparatus is thereby changed over to the recording or reproducing operational mode. In addition, a solenoid 137 (FIG. 5B) operates to actuate a pinch roller pressing lever 95 which has been moved near the operating position thereof in clockwise rotation, whereby the pinch roller 86 is engaged by the pinch roller shaft 91, thereby pressing the tape 16 against the capstan 45 at high pressure. Consequently, the tape 16 is clamped between the pinch roller 86 and the already rotating capstan 45, thereby beginning to travel under driving power.

Furthermore, as another result of the rotation of the pressing lever 95 to the above mentioned operative position, the rotation is transmitted through a rod (not shown) to move a stop member 96 toward the left, thereby releasing a takeup-side tension lever 97. Consequently, the tension lever 97 rotates slightly counterclockwise against the force of a spring 99 in accordance with the tape tension detected by a tension pole 98 fixed in one end of the tension lever 97. At the same time, a brake shoe 100 of the other end presses against the takeup reel disc 18, whereby a tension servomechanism on the takeup side is rendered operative. The guide pin 13 guides the magnetic tape 16 from the tape supply roll 11 within the cassette 10. As the tape is paid out of the cassette, in either the recording or reproducing mode; there is a constant tape tension on the supply side. The tension pole 20 cooperates with the brake band 37 and the tape is guided by a guide pole 101 across a full-erasing head 102, where, for recording, erasure is carried out across the full width of the tape. The tape is then wrapped in a helical shape around the peripheral surface of the guide drum 50 over a specific angular range within limits determined by guide poles 103 and 104. Recording or reproducing of video signals is carried out on the tape by a video head (not shown). The tape is further drawn across a head block 105 disposed with an inclination, where recording or reproducing of audio and control singals is carried out. The tape is then clamped between and driven by the capstan 45 and the pinch roller 86. The tape advancing direction is reversed by the tape guide pole 85. The tape is then guided to guide pins 82a, 82b and 82c on the opposite side of the pinch roller 86. After passing by the guide pole 21, which is locked, there is a constant tape tension on the takeup side which is held by the tension pole 98 as it reenters the cassette 10. The tape is guided by the guide pin 14 to reach the takeup tape roll 12. A suitable torque urges the takeup reel to rotate in the tape takeup direction.

The unloading operation carried out by stopping control of the apparatus is as follows. At the time of stop control, a stop button 106*b* is pushed. A solenoid 107 operates, the control lever 24 is released from its locked state, and is returned to its original position indicated in FIG. 1. As a result of the return of the control lever 24, the lock lever 28 and the tension lever 31 are rotated counterclockwise. The tension pole 20 returns to its original position within the cassette 10 through the opening 17. Furthermore, as a result of the pushing of the stop button 106*b*, a solenoid 137 is deenergized, and the pinch roller actuating device is changed over, as described more fully hereinafter, from the state indicated in FIG. 5B to that indicated by single-dot chain line in FIG. 5A. The force pressing pinch roller 86 against the capstan 45 is abruptly reduced, and the clamping and driving of the tape 16 is terminated.

Interrelatedly with the return movement of the control lever 24, the operation lever 52 rotates counterclockwise through a specific angle. The rotation of the loading lever 60 is limited at its remote position. On one hand, the unloading lever 59 is unlocked and is rotated clockwise by the force of a spring 108. Consequently, a gear 109 at the distant end of the unloading lever 59 meshes with both the gear 62 and a gear 110. The revolving ring drive mechanism is placed in the stage indicated by full line in FIG. 4B. Accordingly, clockwise rotation of the capstan 45, differing from that at the time of loading operation, is transmitted as a counterclockwise rotation to the drive roller 57 pressed against the inner rim of the revolving ring 58 by way of the gears 62, 109, 110 and 63. Consequently, the revolving ring 58 begins to revolve in the counterclockwise direction. The roller 75 disengages the V-shaped notch 72 and presses against the outer peripheral rim of the revolving ring.

Figure 5A:
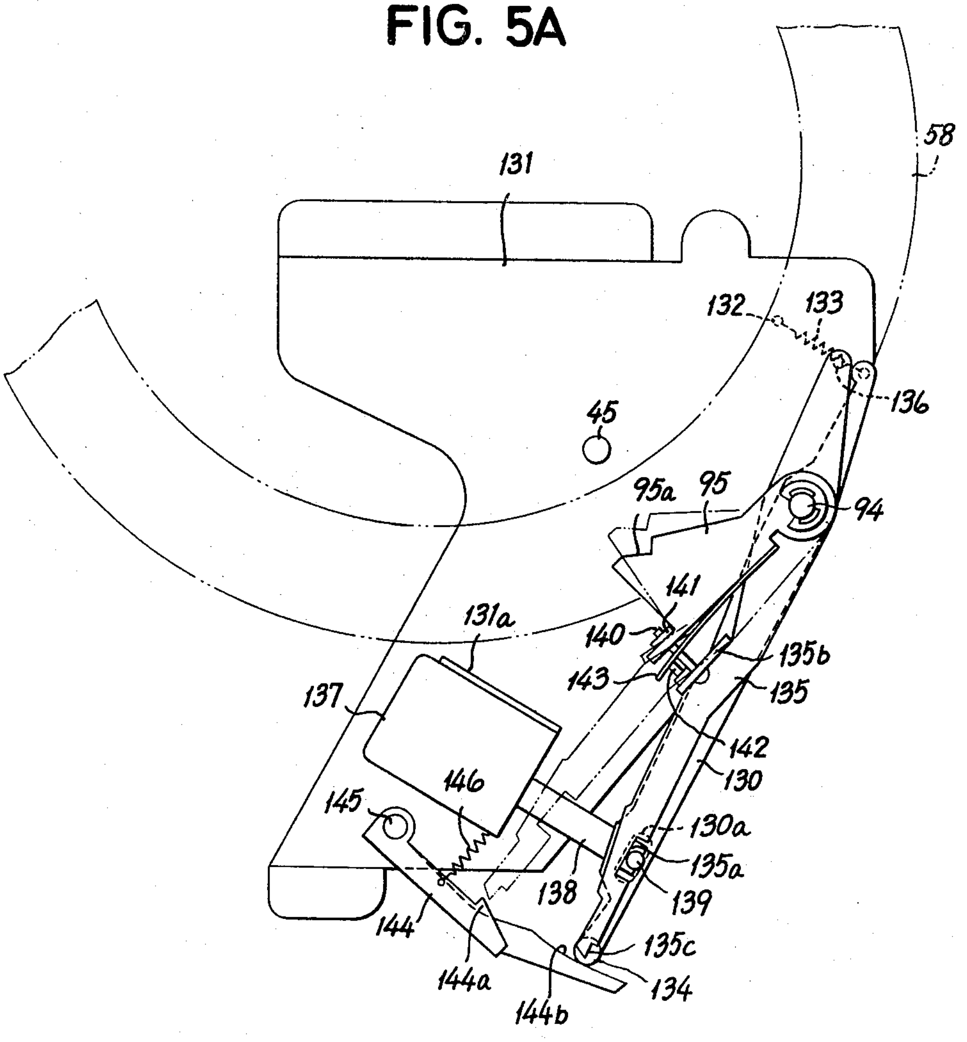
FIGS. 5A and 5B are fragmentary plan views showing one embodiment of a pinch roller actuating device constituting an essential and important part of the invention and indicating this device released in the inoperative and operative states.

As a result of the above described revolution of the revolving ring 58, an engagement pin 136 is released from its engagement with the inclined guide surface 150*a* of the guide plate 150. The second lever 135 rotates substantially unitarily with the pressing lever 95 in the counterclockwise direction relative to the pin 94. The pinch roller actuating device assumes its disengaged state, as indicated in FIG. 5A. The pinch roller 86 separates from the capstan 45.

At this time, the drive roller 43 is held in a position to press against the takeup reel disc 18, which is under a torque urging it to rotate in the tape takeup direction. For this reason, when the revolving ring 58 revolves in the counterclockwise direction. The magnetic tape 16 is drawn out of the cassette 10 and wound successively around the takeup tape roll 12, without slackening. When the revolving ring 58 revolves through approximately one-half revolution, the tape 16 is released from its engagement by the guide pole 85 and is formed into the tape loop 16a of substantially triangular shape, as indicated by a single-dot chain line in FIG. 1, and engaged by the locked guide pole 21.

When the revolving ring 58 revolves further in the counterclockwise direction, and the U-shaped cutout 74 reaches the position indicated by the two-dot chain line in FIG. 1, the pin 81, is limited in movement within the bent slot part 89*a* and is pressed against the outer periphery of the ring 58 by forces such as the spring force of the torsion spring 90 and the tape tension. Pin 81 is pressed into the notch 74. Thereafter this pin 81 moves, being guided by the arcuate slot 89 and the arcuate guide surface 79*a* of the bracket 79, together with the revolution of the ring 58. The first and second arms 76 and 77 change their folded configuration and, as a whole, are rotated in the counterclockwise direction.

When the revolving ring 58 revolves to a position slightly short of the terminal rotational position indicated in FIG. 1, a projection 111 provided on the lower surface of the ring 58 strikes against the unloading lever 59 in its operative position. The unloading lever 59 is rotated to the position indicated by the two-dot chain line in FIG. 4B. Consequently, relative to the revolving ring drive mechanism, the gear 109 is released from its meshed state with the gear 62. The transmission of driving power from the capstan 45 to the revolving ring 58 is terminated.

The revolving ring 58, which is no longer driven, is limited in its revolution at the position indicated in FIG. 1 where the roller 75 pressing against outer peripheral edge of the ring fits into the V-shaped notch 71. As a result of the rotation of the ring to this position, the first and second arms 76 and 77 move from their positions shown in FIG. 2 to those indicated in FIG. 1. The guide pole 21 enters the cassette 10 through the opening 17 to return to its original position. Furthermore, the magnetic tape 16 forming the tape loop 16a is taken up on the tape takeup roll 12 and is thereby completely housed within the cassette 10. Thus the various mechanisms are changed from their respective states shown in FIG. 2 to those indicated in FIG. 1. The unloading operation is completed.

Next to the described is the organization and operation of the revolving ring drive mechanism, which imparts a clockwise torque and a counterclockwise torque to the revolving ring 58, respectively, for loading operation and unloading operation (FIGS. 4A and 4B), which respectively indicate the states of this drive mechanism for the two operations.

Figure 4A:
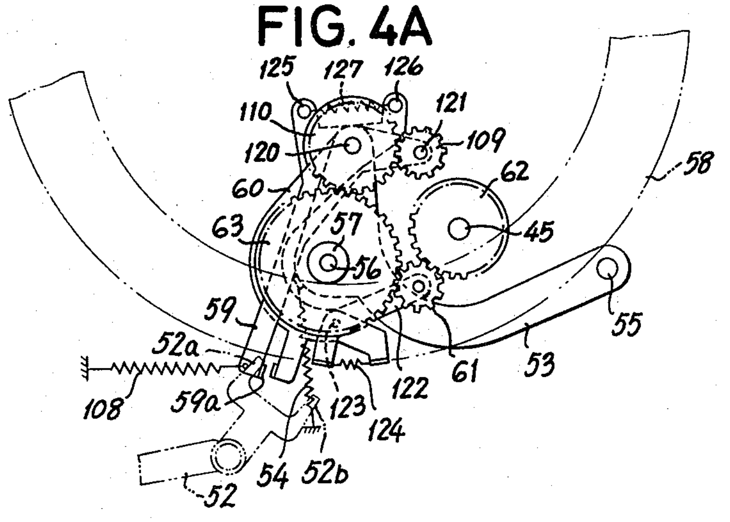
FIGS. 4A and 4B are fragmentary plan views showing one example of a mechanism for driving a revolving ring in the apparatus shown in FIG. 1 and respectively indicating the mechanism at the times of tape loading and tape unloading.
Figure 4B:
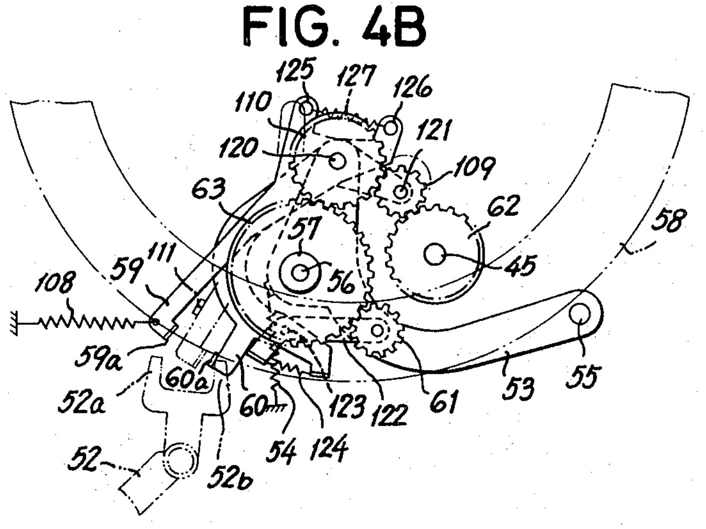

In FIGS. 4A and 4B, the unloading lever 59 and the curved loading lever 60 are both rotatably supported independently on a pivot pin 120 fixed in the holding lever 53. Furthermore, the gear 110 is rotatably supported on the pin 120 and is meshed with the gear 63 formed unitarily with the drive roller 57. The gear 109 is rotatably held by a pivot pin fixed in the distant end of the unloading lever 59 and is meshed with the gear 110. For this reason, when the lever 59 is rotated, the gear 109 revolves around the gear 110 as it revolves about its own axis.

A lever 122 is rotatably connected by a shaft 123 with respect to the loading lever 60 and supports at its free end a gear 61. This lever 122 is caused by a tensioned spring 124 to impart a counterclockwise torque to the loading lever 60. The gear 61 is positively meshed with the gear 63. Accordingly, when the loading lever 60 rotates, the gear 61 revolves around the gear 63 as it rotates about its own axis. Furthermore, since a spring 127 is stretched between pins 125 and 126 fixed in the unloading lever 59 and the loading lever 60, respectively, torques are imparted to urge these levers 59 and 60 to rotate toward their respective operational positions.

In the loading mode of operation indicated in FIG. 4A, the unloading lever 59, at its bent part 59*a*, is engaged by one arm 52*a* of the operation lever 52 rotating in the clockwise direction and is thereby limited in rotation at its released position. The gear 109 is separated from the gear 62. The loading lever 60 is rotated counterclockwise by the tension force of the spring 127. The gear 61 revolves around the gear 63 as it rotates about its own axis and is meshed by the gear 62. Consequently, the clockwise rotation of the capstan 45 is transmitted by way of the gears 62, 61, and 63 and to the drive roller 57 as a clockwise rotation. The revolving ring 58 is turned in the clockwise direction.

In the unloading mode of operation indicated in FIG. 4B, the operation lever 52 is rotating counterclockwise. The loading lever 60 at its bent part 60*a* is engaged by the other arm 52*b* of this operation lever 52 and is limited in rotation at its released position to which it has rotated in the counterclockwise direction. The gear 61 is separated from the gear 62. On one hand, the unloading lever 59 without being limited in rotation is rotated clockwise by the tension force of the springs 127 and 108. The gear 109, as it rotates about its own axis, revolves around the gear 110 and is meshed by the gear 62. Consequently, the clockwise rotation of the capstan is transmitted by way of the gears 62, 109, 110 and 63 to the drive roller 57 as a counterclockwise rotation. The revolving ring 58 is driven in counterclockwise revolution.

In the above described mechanism, when it is in the recording operational mode after completion of loading operation, the unloading lever 59 and the loading lever 60 are both limited in rotation in their inoperative positions as described above. The gears 61 and 109 for transmitting the driving power to the revolving ring 58 are both separated from the driving gear 62. Consequently, in the recording or reproducing mode of operation, the driving gear 62 rotates independently without being subjected to any additional load whatsoever. The recording or reproducing operation is accomplished without any abnormality.

A protector plate 92 has the shape, substantially, of the latter C and has a smooth upper surface. It is provided around the guide drum 50 and is mounted at a position above and separated by a specific distance from the revolving ring 58 and with the same inclination as the ring 58 as illustrated in FIG. 3. Furthermore, this protector plate 92 has a shape such that (FIGS. 1 and 2) it is close to the guide drum 50 particularly in the region thereof where the magnetic tape 16 is wrapped therearound. It extends in a manner to cover the lower surface facing the tape loop successively formed by the magnetic tape 16 as it is drawn out of the cassette 10 at the time of loading. Of the constituent parts disposed on the inner side of the revolving ring 58 and mounted on the chassis 51, those which project above the protector plate 92 are limited to the guide poles 101, 103 and 104, the full-width erasing head 102, a head block 105, and the capstan 45, which are contacted by the tape 16 at the time of recording or reproducing.

Accordingly, the magnetic tape 16, which has sagged toward the chassis 51 when the tape is drawn out of the cassette 10 slackens at the time of loading or unloading. The slackened tape is caught on the upper surface of the protector plate 92 and is prevented from contacting and being caught by the various parts provided on the chassis. The loading and unloading operations are carried out smoothly without any trouble whatsoever.

Next, the control and operation of rewinding and fast forward running in the apparatus of the invention will be described. These operations are carried out with the magnetic tape 16 in its store state, within the cassette 10 (FIG. 1). For rewinding control, the control lever 24 is manipulated to turn clockwise and press the rewind roller 44 against the supply reel disc 19. Since the rewind roller 44 is rotating clockwise at this time, it imparts a counterclockwise torque to the supply reel disc 19 upon being thus pressed thereagainst, whereupon rewinding of the tape 16 is carried out. For fast forward running, the control lever 24 is manipulated to turn clockwise in the same manner as in play control thereby to press the drive roller 43 against the takeup reel disc 18. A fast toward button 106*a* is pressed thereby to hold the operation lever 52 in the position indicated in FIG. 4B. Then, with the apparatus in a state wherein the loading operation, with respect to the tape 16 is stopped, the tape fast forward running operation is carried out.

The above mentioned fast forward button 106*a* is arranged in a row at the front of the apparatus together with other control buttons 106*b*, 106*c* and 106*d*. The control button 106*d* controls audio recording.

Figure 5B:
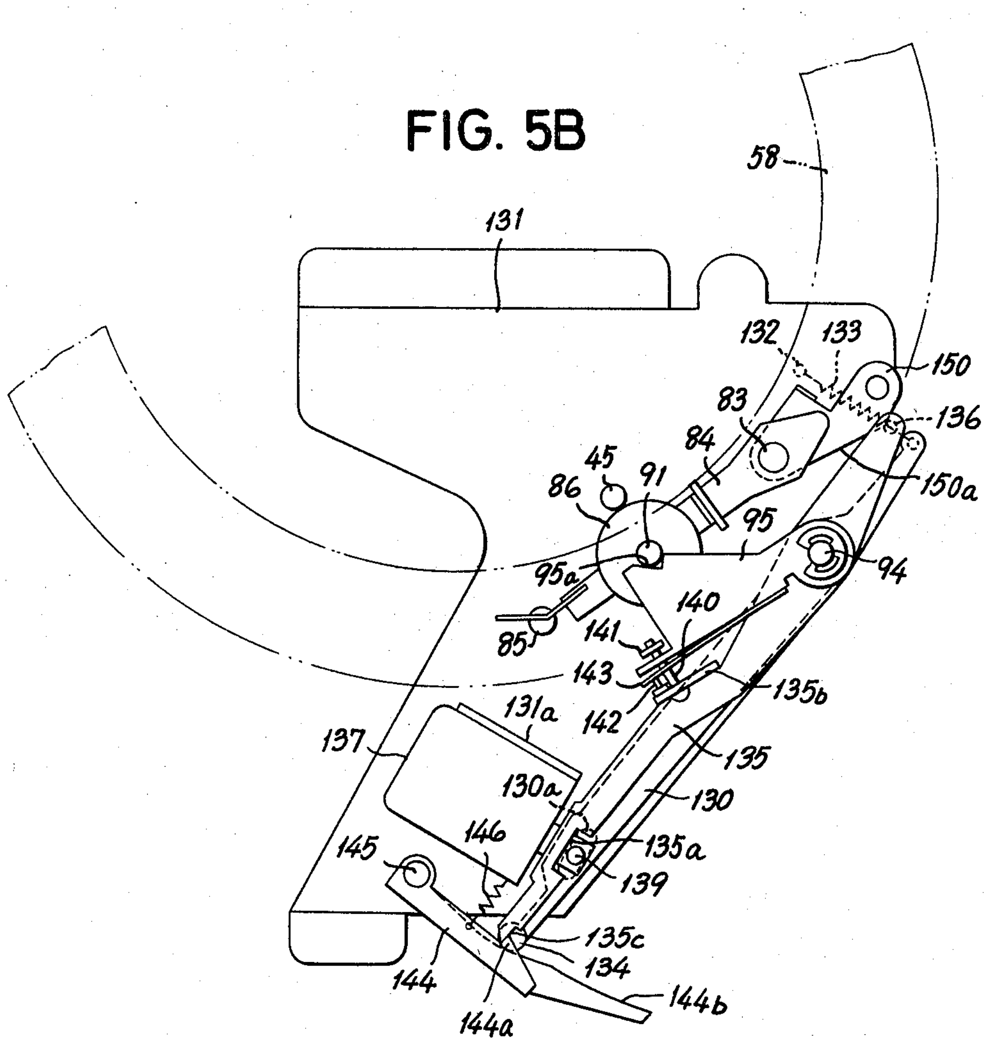

The pinch roller actuating device constituting an essential part of the apparatus of the invention will now be described in greater detail with respect to one embodiment thereof as illustrated in FIGS. 5A and 5B, respectively showing the device in the state prior to operation and in the state after operation.

Referring first to FIGS. 5A, a first lever 130 is pivotally supported on the pin 94, which also supports the pinch roller pressing lever 95. A spring 133 is stretched between the outer end of one arm of this first lever 130 and a pin 132 fixed in a subchassis 131 mounted on the chassis 51. Spring 133 imparts a counterclockwise torque to the first lever 130, but the first lever 130 is detained at the disengaged position shown in (FIG. 5A) and restricted from turning further therebeyond by an engagement piece (not shown). The other arm of the first lever 130 is provided near its end with a slot 130*a* and rotatably supports at its tip a small roller 134.

A second lever 135 is also pivotally supported on the pin 94 at a position above the first lever 133. An engagement pin 136 is embeddedly fixed to the lower surface of the end of one arm of this second lever 135 and extends approximately to the upper surface of the revolving ring 58. The other arm of this second lever 135 is provided with a cutout 135*a* and a bent flange part 135*b* and is further provided at its tip with an engagement part 135*c*.

A solenoid 137 is mounted on a bent flange part 131*a* of the subchassis 131 and holds the inner end of a rod 138. This rod 138 at its outer end is provided with an engagement pin 139 fixed thereto and projecting in the upward and downward direction. The upwardly projecting part of this pin 139 is engaged with the cutout 135*a* of the second lever 135, while the downwardly projecting part of this pin is engaged with the slot 130*a* of the first lever 130. Accordingly, when the solenoid is inoperative, the rod 138 is in the position indicated in FIG. 5A, having been drawn out to this position by the counterclockwise rotation of the first lever 130 due to the force of the spring 133.

A rod 140 is fixed in its root part to the bent flange part 135*b* of the second lever 135 and extends through an opening (not shown) in the back surface of the U-shaped pressing lever 95. An engagement piece 141 is adjustably supported on the outer tip of this rod 140. Furthermore, one part of a leaf spring 143 extends to a position for contacting a pressing pin 142 adjustably fixed to the bent flange part 135*b* of the second lever 135 and fixed to the back surface of the U-shaped pressing lever 95. By this structural arrangement, the pressing lever is urged to rotate clockwise by the resilience of the leaf spring 143 but is limited in rotation at its disengaged position (FIGS. 1 and 5A), where its back surface part is caught by the engagement piece 141.

A lock lever 144 of bent U-shaped or channel cross section is pivotally supported on a pin 145 fixed at its root part in the sub-chassis 131 and is urged to turn counterclockwise by the tension force of a spring 146. However, since a locking part 144*a* and a striking contact part 144*b* having the shapes as shown in FIGS. 5A and 5B and provided respectively on the upper and lower flanges of the lock lever 144 are positioned to confront the ends of the second lever 135 and the first lever 130, the striking contact part 144*b* is stopped from rotating at a position where it is pressing against the roller 134 at the tip of the first lever 130 (FIG. 5A) if the solenoid is de-energized.

The pinch roller actuating device of the above described mechanical organization, according to the invention, operates in the following manner.

First, to be described is the approaching or gently contacting action of the pinch roller 86 relative to the capstan 45 during the revolution of the revolving ring 58 to its terminal position, at the time of tape loading. When the revolving ring 58 reaches a position slightly short of the terminal rotation position (FIG. 2) it intercepts, by means of the tape guide pole 85, the magnetic tape 16 and pulls it around the periphery of the guide drum 50. An inclined guide surface 150a of the guide plate 150 is fixed at a specific position on the revolving ring 58 and contacts the lower end of the engagement pin 136 fixed in the lower surface of the second lever 135 rotated in the counterclockwise direction.

When the revolving ring 58 revolves further in the clockwise direction from this position, the engagement pin 136 is guided by the inclined guide surface 150*a*. The second lever 135 rotates clockwise, independently of the first lever 130, to the position indicated by single-dot chain line in FIG. 5A against the force of a spring (not shown). At this time, the lock lever 144 is restrained from counterclockwise rotation since the striking part 144*b* is engaged by the roller 134 of the first lever 130, which is in disengaged position. Accordingly, the engagement part 135*c* of the second lever 135 is in a state wherein it is not locked by the engagement part 144*a* of the lock lever 144.

As a result of the above described operation, the pressing lever 95 is rotated clockwise to the position indicated by single-dot chain line in FIG. 5A substantially unitarily with the second lever 135, as this second lever 135 rotates. As a result of this rotation of the pressing lever 95, the base part and the outer end part of the pinch roller shaft 91 secured to the pinch roller supporting lever 84 are respectively engaged by the cut out recess 95*a* formed on the upper and lower bent flanges of the pressing lever 95. The lever 84 is turned clockwise against the force of a torsion coil spring (not shown). The pinch roller 86 is rotatably supported on the shaft 91 and contacts the already rotating capstan 45 with the magnetic tape 16 interposed therebetween. However, the pinch roller 86 at this time is not being forcibly pressed against the capstan 45. The contacting force with respect thereto is extremely weak. The action of clamping and driving the tape 16 by the pinch roller 86 and the capstan 45 is not carried out.

Next, the pressing action of the pinch roller 86 relative to the capstan 45 at the time of completion of the loading operation will be described. When the revolving ring 58 revolves to the terminal position indicated in FIGS. 2 and 5B, a microswitch (not shown) installed at a specific position is closed, as mentioned hereinbefore. The solenoid 137 is activated, and the rod 138 is drawn in.

At this time, the second lever 135 and the pinch roller pressing lever 95 have already rotated to the positions indicated by single-dot chain line in FIG. 5A. Consequently, as the rod 138 is drawn in as mentioned above, only the first lever 130, which has been in the disengaged position, is first turned clockwise against the relatively small tension force of the spring 133. Its slot 130a is engaged by the engagement pin 139. When the rod 138 has been sufficiently drawn into the solenoid 137, the part projecting above the engagement pin 139 engages the cutout 135*a* of the second lever 135. Moreover, a clockwise torque is applied to the second lever 135.

Then, as the rod 138 is sufficiently drawn into the solenoid 137, energy is stored in the rod 138. In addition, the drawing force imparted to the rod 138 by the solenoid 137 becomes a relatively large value (FIG. 6) whereby the second lever 135, overcoming the relatively large resilient force of a spring (not shown) and the leaf spring 143, further rotates clockwise together with the first lever 130. Consequently, the end part of leaf spring 143 is engaged and further deflected by the pressing pin 142 and is thereby energized to impart a large clockwise torque to the pressing lever 95. Accordingly, the pinch roller which is already placed in light contact against the capstan 45, with the magnetic tape 16 interposed therebetween or in very close proximity to the tape. The pinch roller is now pressed with a large force toward the capstan 45, whereby the tape 16 is firmly clamped therebetween and driven and thereby starts to travel.

First, the contacting and engaging part 144b of the lock lever 144 is guided by the roller 134 and is shaped so that, the lock lever 144 is once rotated clockwise against the force of the spring 146 during the movement of the roller 134 along an arcuate path at the time of the above mentioned rotation of the first lever 130. Lever 144 is then rotated by the spring 146 further counterclockwise than the initial position indicated in FIG. 5A to the engagement position indicated in FIG. 5B. For this reason, when the first lever 130 is rotated by the actuation of the solenoid 138 to the position indicated in FIG. 5B, the second lever 135 is intercepted at its end engagement part 135c by the engagement part 144a of the lock lever 144, which has rotated to the locking position.

Accordingly, as with the apparatus in the above described mode of operation, the drawing force on the rod 138 is reduced by decreasing the energization of the solenoid 137. The lock lever 144 is held in the locking position provided that the first lever 130 is held in the position indicated in FIG. 5B against the tension force of the spring 133 by the drawing force of the solenoid 137 on the rod 138. Then, the second lever 135 is held in the position indicated in FIG. 5B at which the engagement part 135c thereof is caught by the engagement part 144*a* of the lock lever 144. The clamping and driving of the tape 16 by the pinch roller 86 and the capstan 45 is continuously sustained without interruption. For this reason, the electric power supplied to the solenoid 137 after completion of operation can be reduced to a value less than the power supplied at the time of starting. Thus, the power consumption of the apparatus can be held at a low value.

In accordance with the above described embodiment, the initial movement of the pinch roller moves it to a position approximately touching the capstan 45 during the pressing of the pinch roller 86 toward the capstan 45 by the rotational force of the revolving ring 58. The invention is not thus limited. It is also possible to utilize rotational force or torque from other components such as the guide drum 50, the capstan 45, and the reel discs.

Next to be described is the pressing of the pinch roller 86 against the capstan 45 by the pinch roller actuating device. With the recording/reproducing apparatus in the recording or reproducing mode of operation (FIG. 2), when the stop button 106*b* is pushed, the power source circuit including the solenoid 137 is open-circuited. The drawing force on the rod 148 is terminated. Consequently, the first lever 130 is rotated counterclockwise by the spring 133. The rod 138 is pulled out of the solenoid 137 with the pin 139 still fitted in the slot 130*a* of the lever 130.

As a result of the above described rotation of the first lever 130, the lock lever 144 is rotated clockwise against the force of the spring 146, in the direction reverse to that at the time of the pinch roller pressing action. The lock lever is moved to the original disengaged position indicated in FIG. 5A as the contacting part 144*b* is guided by the roller 134 moving along an arcuate path. As a result, the engagement part 135*a* of the second lever 135 is released from its engagement by the locking part 144*a* of the lock lever 144. The second lever 135 is turned slightly in the counterclockwise direction by a spring (not shown) to a position where the engagement pin 136 fixed in one end of the second lever contacts the inclined guide surface 150*a* of the guide plate 150 fixed to the revolving ring 58, as indicated by single-dot chain line in FIG. 5A. As a result of this rotation of the second lever 135, the spring force of the leaf spring 143 decreases. The torque on the pressing lever 95 is weakened in the direction toward the operational position. Consequently, the force pressing the pinch roller 86 against the capstan 45 is greatly reduced. The traveling of the magnetic tape 16 is stopped.

Furthermore, as another result of the pushing of stop button 106*b*, the revolving ring 58 starts to revolve counterclockwise. Consequently, the second lever 135, acted upon by a counterclockwise torque imparted by a spring (not shown), is gradually rotated in the counterclockwise direction as the engagement pin 136 is held in contact with the inclined guide surface 150*a* of the guide plate 150 moving together with the revolving ring 58. The second lever 135 is returned to its original position (FIG. 5A) where it is caught by an engagement member (not shown). Thus, the pinch roller actuating device is moved into the original disengaged state as indicated in FIG. 5A.

The relationship between the attractive force and stroke of a solenoid suitable for use in the pinch roller actuating device according to the invention will now be described in conjunction with FIG. 6. In the graph shown in FIG. 6, curve 160 indicates the relationship between the distance separating the pinch roller from the capstan and the actuating force required at that position for moving the pinch roller to the capstan side in a pinch roller actuating device of known solenoid driven type. The curve 161 indicates the relationship between the stroke and attractive forced of one example of a solenoid suitable for use in a device having the above described characteristic. In this solenoid, there is necessity for applying a relatively large attractive force to the rod even when the rod has not been fully drawn. For this reason, the base part of the rod is formed with a truncated cone shape.

Figure 6:
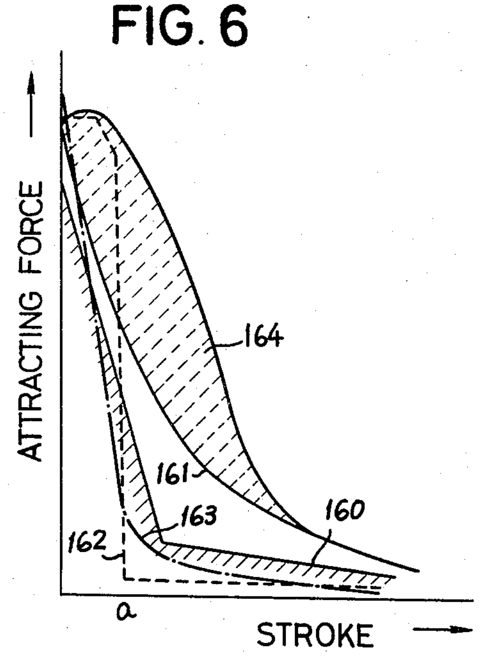
FIG. 6 is a graph indicating the stroke-attracting force characteristic of a solenoid suitable for application to the pinch roller actuating device of the invention.

Furthermore, the curve 162 shown by intermittent line in FIG. 6 indicates the relationship between the aforementioned separation distance between the pinch roller 86 and the capstan 45 in the pinch roller actuating device, according to the invention and the actuating force required for displacing the pinch roller 86 at that position to the side of the capstan 45. If the pinch roller 86 is to be moved from its disengaged position to its operative position pressing against the capstan 45, the operation of first moving the pinch roller 86 from its disengaged position to a position where it lightly touches the capstan or to a position (point a in FIG. 6) at a specific distance away from the capstan is accomplished by a relatively small force required to rotate the second lever 135 as indicated in FIG. 5A to the position indicated by single-dot chain line in FIG. 5A.

Then, for strongly pressing the pinch roller 86 against the capstan 45, it is necessary to forcefully deform the leaf spring 143, whereby a large force is suddenly required. Accordingly, a solenoid of a characteristic whereby the initial attractive force on the rod is relatively small can also be applied.

In the same FIG. 6, the curve 163 indicates the relationship between the stroke position of the rod 138 and the attractive force on the rod at that position in a solenoid 137 having the above mentioned characteristic and applied to the pinch roller actuating device according to the invention. As is apparent from FIG. 6, the attractive drawing force imparted to the rod 138 of the solenoid 137 is a small value when the rod 138 is drawn out through a large distance as indicated in FIG. 5A. The force rapidly increases when the rod 138 is this drawn and advances into the solenoid 137 to the vicinity of the stroke position *a*.

As described above, the load imposed on the rod 138 is held at a low value in the initial action of the solenoid 137. For this reason, the movement of the rod 138 to the stroke position *a* is carried out with little or almost no use of the attractive force induced by the solenoid 137. Moreover, in an abrupt manner, and energy represented by the area 164 indicated by intermittent line cross hatching in FIG. 6 is stored in the solenoid 137 and the rod 138. For this reason, this stored energy and the attractive force imparted to the rod 138, which has moved to the stroke position *a*, becomes additive. The resultant combined pressing force acts on the pinch roller 86, which has already moved together with the pressing lever 95. The second lever 135 moves to a position for pressing the pinch roller against the capstan 45 prior to the operation of the solenoid 137. The pinch roller 86 is actuated by this combined pressing force to press firmly against the capstan. It should be noted that the base part of the rod 138 of the solenoid 137 having a characteristic as indicated by curve 163 can also have the shape of a circular column.

Figure 7:
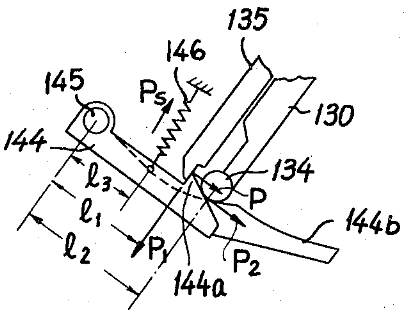
FIG. 7 is a fragmentary plan view showing a locking mechanism in the apparatus shown in FIGS. 5A and 5B.

Next, the manner in which the pinch roller 86 is held in and released from its pressing state against the capstan will be described in conjunction with FIGS. 7 and 8. The functional state of a lock mechanism when the pinch roller 86 is pressed against the capstan 45 is indicated in FIG. 7. The end engagement part 135*c* of the second lever 135 is shown to be locked by the locking part 144*a* of the lock lever 144. Furthermore, the unlocking action of this mechanism, that is, the action of the pinch roller 86 terminating its pressing state against the capstan 45, is accomplished by the rotation of the first lever 130 in the counterclockwise direction under the tension force of the spring 133, as described hereinbefore. That is, in order to hold the pinch roller 86 pressed against the capstan 45, the first lever 130 is held by the solenoid 137 in the rotational position indicated in FIG. 5B or FIG. 7 against the tension force of the spring 133. For this reason, the attraction force required for actuating the rod 138 of the solenoid 137 is much smaller than that required in a conventional device.

The torque required for rotating the first lever 130 counterclockwise as the lock lever 144 is rotated compulsorily in the unlocking direction will now be considered with reference to FIG. 7. First, the force $P_1$ acting on the locking part 144a has a magnitude required to rotate the lock lever 144 in the locking position compulsorily toward the unlocking direction, can be expressed by the following equation.

$$P_1 = l_3/l_1 \, Ps + P \cdot \mu 1 \qquad (1)$$

where:

$l_1$ is the distance between the pivot point of the lock lever 144 and the locking part 144*a;*

$l_3$ is the normal distance from the pivot point of the lock lever 144 to the line of action of the spring 146;

Ps is the tension force of the spring 146;

P is the force acting at the end engagement part 135*c* of the second lever 135 due to the counterclockwise torque applied thereto by the leaf spring 143; and $\mu 1$ is the coefficient of friction (of the order of 0.2) between the locking part 144*a* of the lock lever and the engagement part 135*c* of the second lever 135.

In Eq. (1), while the force $P_1$ similarly increases with the increase in the tension force Ps of the spring 146 in accordance with the movement of the lock lever 144 in the unlocking direction, it is held at a value less than the force P since the friction coefficient $\mu 1$ is of the order of 0.2.

On one hand, the force $P_2$ acting on the end of the lever 130 has a magnitude required to rotate it in the counterclockwise direction from the position indicated in FIG. 7 as it rotates the lock lever 144 in the unlocking direction is expressable by the following equation.

$$P_2 = l_1/l_2\ \mathrm{A} \cdot P_1 \cdot \mu 2 \qquad (2)$$

where:

$l_2$ is the distance from the pivot point of the lock lever 144 to the point of contact between the roller 134 of the first lever 130 and the locking part 144*a* of the lock lever 144;

A is a coefficient determined by the mode of contact with the contact part 144*b* of the roller 134 with different inclination angle; and $\mu 2$ is the coefficient of friction (of the order of 0.2) between the roller 134 and the contact part 144*b*.

In Eq. (2), the force $P_2$ becomes an extremely small value since it results from multiplying the relatively large force P twice with friction coefficients of the order of 0.2.

Figure 8:
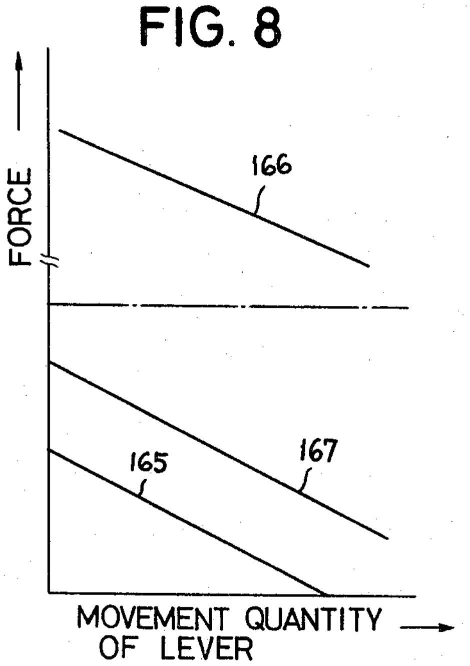
FIG. 8 is a graph indicating the lock-holding characteristic of the locking mechanism illustrated in FIG. 7.

The actuating force required for the solenoid 137 to hold the pinch roller 86 pressed against the capstan 45 in the above described device is graphically indicated in FIG. 8, in which the abscissa represents the quantity of movement of the first lever 130 in the inoperative direction. The ordinate represents the force required for effecting this movement. A line segment 165 indicates the force $P_2$, given by Eq. (2), required to rotate the first lever 130 as the lock lever 144 is turned in the unlocking direction. Since the distance $l_2$ as a variable, is caused to increase by the movement of the first lever 130, the force $P_2$ gradually decreases, whereby the line segment 165 slopes downward toward the right.

The force $P_1$ represented by a line segment 165 is limited to a much smaller value than that of line segment 166 indicating the force required for pressing the pinch roller against the capstan in a conventional pinch roller actuating device. A line segment 167 indicates the force acting on the end of the first lever 130 when a counterclockwise torque is imparted by the tension force of the spring 133 to the lever 130. This line segment 167 is at a higher position than the line segment 165 and slopes downwardly toward the right, indicating a progressive decrease with the counterclockwise rotation of the first lever 130.

For this reason, the attractive force required for the solenoid 137 to hold the first lever 130 at the position to which it has rotated clockwise is of a sufficiently high value. If the displacement of the first lever 130 is zero, the device is in the state indicated by FIG. 5B. The attractive force is then of a value which is higher than the level indicated by single-dot chain line. This level results from a consideration of an appropriate safety value with respect to the value of the line segment 167.

Therefore, in the device of this invention, it is possible to hold the pinch roller 86 pressed against the capstan 45 even with the use of a solenoid having a relative weak attraction characteristic as indicated by curve 163 in FIG. 6.

Next to be described is a mechanism for adjusting the force with which the pinch roller 86 presses against the capstan 45 and a mechanism for adjusting the position of the pinch roller pressing lever 95.

In the pinch roller actuating device (FIGS. 5A and 5B) the adjustment of the force with which the pinch roller 86 is pressed against the capstan 45 is accomplished through the adjustment of the resilient force of the leaf spring 143 by varying the amount of projection of the pressing pin 142, comprising a set screw relative to the bent flange part 135*b* of the lever 135. The position of the pinch roller pressing lever 95 relative to the solenoid 137 can be readily adjusted by rotationally adjusting the engagement member 141 screw connected to the rod 140 without adjusting the mounting position of the solenoid as in the conventional manner. Therefore, in the device of this organization, there is no necessity of changing the mounting position of the solenoid 137 when carrying out the various adjustments mentioned above. For this reason, the impairment of the effective stroke versus attraction force characteristic of the solenoid due to these various adjustment procedures can be prevented.

In the above described embodiment, the pinch roller 86 and the pinch roller pressing means are constructed as separate structures. However, it is also possible to construct these means as an integral unit similarly as in the cases, for example, of known open-reel type VTR and tape recorders.

Further, this invention is not limited to these embodiments but various variations and modifications may be made without departing from the scope and spirit of the invention.

What I claim is:

1. Automatic tape loading type recording and/or reproducing apparatus comprising loading means for drawing a tape-form of recording medium out of a tape housing structure and loading the same along a specific tape path, moving means for moving said loading means from a disengaged position to an operative position and for returning the same from the operative position to the disengaged position, a capstan means and pinch roller means disposed along the specific tape path, pinch roller actuating means responsive to the arrival of said loading means at the operative position for pressing said pinch roller against said capstan with the recording medium interposed therebetween to move the recording medium along the specific tape path, and means for recording and/or reproducing from the recording medium moving along the specific tape path signals, said pinch roller actuating means comprising:

a. a solenoid having a plunger rod, one end of which is provided with a pin;

b. a lever member engaging the pin of the solenoid plunger, said lever member being pivoted on a pivot pin;

c. a pressing member swingable between first and second positions, at the first position said pressing member being spaced apart from the pinch roller which is spaced apart from said capstan and releasably engaging the pin of the plunger rod in an unenergized state of said solenoid, at the second position the pressing member pressing the pinch roller against said capstan with the recording medium interposed therebetween;

d. pushing means for releasing said pressing member from engagement with the pin of the plunger rod and moving said pressing member from the first position toward the second position to contact and move the pinch roller toward said capstan, as said loading means moves from the disengaged position toward the operative position;

e. energizing means responsive to the arrival of said loading means at the operative position for energizing said solenoid to pull the plunger rod and rotate said lever member about the pivot pin whereby said pressing member is impacted by the pin of the moving plunger rod and engaged by the pin of the plunger rod so as to swing to the second position;

f. locking means responsive to the rotation of said lever member by said energizing means for locking said pressing member at the second position and holding the pinch roller pressed against said capstan while said loading means lies on the operative position.

2. Automatic tape loading type recording and/or reproducing apparatus according to claim 1 wherein said tape loading means comprises a revolvable ring having a guiding member for engaging the recording medium and loading the same in the specific tape path; said moving means comprising means for revolving said ring to move the guiding member from the disengaged position to the operative position; said pressing member being mounted on means pivoted on the pivot pin; said pushing means being mounted at a specific position on said revolvable ring and having a guiding surface which engages and pushes one part of said pressing member in the unenergized state of said solenoid to rotate said pressing member about the pivot pin from the first position toward the second position as said ring revolves from the disengaged position to the operative position so that said pressing member moves the pinch roller to a predetermined position in the vicinity of said capstan.

3. Automatic tape loading type recording and/or reproducing apparatus according to claim 2 in which said pressing member comprises means for adjusting the force with which the pinch roller presses against said capstan when the pressing member swings to the second position, and means operated independently of said adjusting means for adjusting the predetermined position of the pinch roller.

4. Automatic tape loading type recording and/or reproducing apparatus according to claim 2 in which said locking means comprises a locking lever pivoted on another pivot pin, said locking lever having a locking portion and a guide portion contacting with one end of said lever members, said guide portion causing said locking lever to swing about the other pivot pin in response to the rotation of said lever member whereby said locking portion engages and locks said pressing member lying at the second position by the energization of said solenoid.

* * * * *